(12) United States Patent
St. Clair

(10) Patent No.: US 7,625,967 B2
(45) Date of Patent: Dec. 1, 2009

(54) OIL GELS OF CONTROLLED DISTRIBUTION BLOCK COPOLYMERS AND ESTER OILS

(75) Inventor: David John St. Clair, Houston, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 222 days.

(21) Appl. No.: 11/369,563

(22) Filed: Mar. 7, 2006

(65) Prior Publication Data

US 2006/0205849 A1     Sep. 14, 2006

Related U.S. Application Data

(63) Continuation-in-part of application No. 11/077,670, filed on Mar. 11, 2005.

(51) Int. Cl.
*C08L 53/02* (2006.01)

(52) U.S. Cl. .................. 524/315; 524/318; 524/321; 524/322; 525/271; 525/284; 525/300

(58) Field of Classification Search .......... 525/271, 525/284, 300; 524/315, 318, 321, 322
See application file for complete search history.

(56) References Cited

U.S. PATENT DOCUMENTS

| | | |
|---|---|---|
| 3,149,182 A | 9/1964 | Porter |
| 3,239,478 A | 3/1966 | Harlan, Jr. |
| 3,494,942 A | 2/1970 | Miki et al. |
| 3,595,942 A | 7/1971 | Wald et al. |
| 3,634,594 A | 1/1972 | Hiyama |
| 3,670,054 A | 6/1972 | De La Mare et al. |
| 3,700,633 A | 10/1972 | Wald |
| 3,830,767 A | 8/1974 | Condon |
| 4,329,298 A * | 5/1982 | Brown et al. ............... 554/125 |
| 4,578,429 A | 3/1986 | Gergen et al. |
| 4,798,853 A | 1/1989 | Handlin, Jr. |
| 4,882,384 A | 11/1989 | Willis et al. |
| 4,898,914 A | 2/1990 | Gergen et al. |
| 4,970,265 A | 11/1990 | Willis |
| 5,206,300 A | 4/1993 | Chamberlain |
| 5,221,534 A * | 6/1993 | DesLauriers et al. ...... 424/78.03 |
| 5,276,101 A | 1/1994 | Chamberlain et al. |
| 5,334,646 A | 8/1994 | Chen |
| 5,336,708 A | 8/1994 | Chen |
| 5,405,903 A | 4/1995 | Van Westrenen et al. |
| 5,459,193 A * | 10/1995 | Anderson et al. ........... 524/505 |
| 5,506,299 A | 4/1996 | Gelles et al. |
| 5,516,831 A | 5/1996 | Pottick et al. |
| 5,646,109 A * | 7/1997 | Owen et al. .................. 514/2 |
| 5,707,648 A * | 1/1998 | Yiv .......................... 424/450 |
| 5,777,043 A | 7/1998 | Shafer et al. |
| 5,879,694 A | 3/1999 | Morrison et al. |
| 5,994,450 A | 11/1999 | Pearce |
| 6,420,333 B1 * | 7/2002 | Hsu et al. ................... 510/441 |
| 6,667,354 B1 | 12/2003 | Fox et al. |
| 6,881,776 B2 * | 4/2005 | Butuc ....................... 524/284 |
| 2002/0055562 A1 | 5/2002 | Butuc |
| 2003/0153681 A1 | 8/2003 | St. Clair et al. |
| 2003/0176582 A1 | 9/2003 | Bening et al. |
| 2003/0181584 A1 | 9/2003 | Handlin, Jr. et al. |
| 2003/0181585 A1 | 9/2003 | Handlin, Jr. et al. |
| 2004/0002560 A1 * | 1/2004 | Pearce ....................... 524/270 |
| 2004/0008669 A1 | 1/2004 | Bos et al. |
| 2004/0070187 A1 | 4/2004 | Chen |
| 2004/0138371 A1 | 7/2004 | St. Clair et al. |
| 2004/0146541 A1 | 7/2004 | Chen |
| 2006/0153966 A1 * | 7/2006 | Simburger ................. 426/660 |
| 2007/0066753 A1 * | 3/2007 | Ehrlich et al. ................ 525/89 |
| 2007/0154541 A1 * | 7/2007 | Murai et al. ................ 424/451 |

FOREIGN PATENT DOCUMENTS

| | | |
|---|---|---|
| EP | 0058022 | 8/1982 |
| EP | 0 822 227 A1 | 2/1998 |
| GB | 2 168 991 A | 7/1986 |
| WO | WO 91/05014 | 4/1991 |
| WO | WO 03/066696 A1 | 8/2003 |
| WO | WO 03/066697 A1 | 8/2003 |
| WO | WO 03/066731 A1 | 8/2003 |
| WO | WO 03/066769 A1 | 8/2003 |
| WO | WO 2005/095513 A1 | 10/2005 |

* cited by examiner

*Primary Examiner*—Jeffrey C Mullis
(74) *Attorney, Agent, or Firm*—Novak, Druce & Quigg LLP

(57) ABSTRACT

The present invention relates to oil gel compositions that include at least one non-aromatic ester oil and an anionic block copolymer of a mono alkenyl arene and a conjugated diene. The block copolymer is selectively hydrogenated and has mono alkenyl arene end blocks and a controlled distribution block of a mono alkenyl arene and a conjugated diene midblock. The ester oil is a non-aromatic, ester compound such as soybean oil, rapeseed oil, and other like compounds.

18 Claims, No Drawings

OIL GELS OF CONTROLLED DISTRIBUTION BLOCK COPOLYMERS AND ESTER OILS

RELATED APPLICATION

This application is a continuation-in-part application of U.S. application Ser. No. 11/077,670, filed Mar. 11, 2005.

FIELD OF THE INVENTION

The present invention relates to an oil gel composition, and more particularly to an oil gel composition including a controlled distribution block copolymer and at least one non-aromatic ester oil.

BACKGROUND OF THE INVENTION

The preparation of block copolymers of mono alkenyl arenes and conjugated dienes is well known. One of the first patents on linear ABA block copolymers made with styrene and butadiene is U.S. Pat. No. 3,149,182. These polymers, in turn, could be hydrogenated to form more stable block copolymers, such as those described, for example, in U.S. Pat. No. 3,595,942 and U.S. Reexamination No. 27,145. Such polymers are broadly termed 'Styrenic Block Copolymers' or SBC's.

SBC's have a long history of use as adhesives, sealants and gels. A recent example of such a gel can be found, for example, in U.S. Pat. No. 5,879,694. With the increased use of oil gels, the need for improved properties (expressed in terms of higher tensile strength and higher elongation) exist. Such gels may also be used, for example, as a water proofing encapsulant/sealant for electronics and in wire and cable applications.

An anionic block copolymer based on mono alkenyl arene end blocks and a controlled distribution mid block of a mono alkenyl arene and a conjugated diene has been discovered and is described in copending and commonly assigned U.S. patent application Ser. No. 10/359,981, filed Feb. 6, 2003 and entitled "NOVEL BLOCK COPOLYMERS AND METHOD FOR MAKING SAME". Methods for making such polymers are described in detail in the above-mentioned patent application.

Copending and commonly assigned U.S. patent application Ser. No. 10/359,462 filed Feb. 6, 2003 and Ser.No. 10/745,352 filed Dec. 22, 2003, both entitled "GELS FROM CONTROLLED DISTRIBUTION BLOCK COPOLYMERS" describe gel compositions that include the anionic block copolymer of the '981 application and a mineral oil such as, for example, a petroleum-based white oil. Examples of such petroleum-based oils include paraffinic oil and naphthenic oil. It is reported in the '462 and the '352 applications that such gel compositions have improved properties including, for example, a high softening point and melt viscosity, as compared to gel compositions that include conventional hydrogenated anionic block copolymers.

Although improved gel compositions are disclosed in the '462 and '352 applications, those gel compositions use mineral oils that are not considered to be environmentally friendly. There is thus an interest in gelling natural product oils, such as soybean oil, because the natural product oils are considered to be more environmentally friendly. One problem with using natural product oils in the preparation of gel compositions is that such oils are not always compatible with the polymer it is being gelled with. For example, natural product oils are too polar to be used with most conventional anionic block copolymers.

It has now been surprisingly discovered by the present applicant that the anionic block copolymers of the '981 application are compatible with natural product oils such as, for example, soybean oil and other like ester compounds, and that substantially clear blends, which do not exhibit any significant oil bleed can be formulated.

SUMMARY OF THE INVENTION

The present invention provides a gel composition that includes at least one non-aromatic ester oil and at least one hydrogenated block copolymer having a controlled distribution block of a mono alkenyl arene and a conjugated diene. The hydrogenated block copolymer employed in the present invention has at least one polymer block A and at least one polymer block B wherein:

(a) prior to hydrogenation each A block is a mono alkenyl arene homopolymer block and each B block is a controlled distribution copolymer block of at least one conjugated diene and at least one mono alkenyl arene;

(b) subsequent to hydrogenation about 0-10% of the arene double bonds have been reduced, and at least about 90% of the conjugated diene double bonds have been reduced;

(c) each A block has a number average molecular weight between about 3,000 and about 60,000 and each B block has a number average molecular weight between about 30,000 and about 300,000;

(d) each B block comprises terminal regions adjacent to the A blocks that are rich in conjugated diene units and one or more regions not adjacent to the A blocks that are rich in mono alkenyl arene units;

(e) the total amount of mono alkenyl arene in the hydrogenated block copolymer is about 20 percent weight to about 80 percent weight; and (f) the weight percent of mono alkenyl arene in each B block is between about 10 percent and about 75 percent.

The general configuration of the block copolymer employed in the present invention is A-B, A-B-A, $(A-B)_n$, $(A-B)_n$-A, $(A-B-A)_nX$, $(A-B)_nX$ or a mixture thereof, where n is an integer from 2 to about 30, preferably 2 to about 15, more preferably 2 to about 6, and X is coupling agent residue.

The gel composition of the present invention typically includes 100 parts by weight of said anionic block copolymer having the controlled distribution mid-block and from about 250 to about 2000 parts by weight of said ester oil.

The inventive gels of the present invention can be used, for example, as a water proofing encapsulant/sealant for electronics and in wire and cable applications. The inventive gels can also be used as a lubricating oil, as a grease or as an oil field drilling fluid. Other uses for the gels of the present invention, include, but are not limited to: a vibration damper, a vibration isolator, a wrapper, a hand exerciser, dental floss, a crutch cushion, a cervical pillow, a bed wedge pillow, a leg rest cushion, a neck cushion, a mattress, a bed pad, an elbow pad, a dermal pad, a wheelchair cushion, a helmet liner, a hot or cold compress pad, an exercise weight belt, an orthopedic shoe sole, a splint, sling or brace cushion for the hand, wrist, finger, forearm, knee, leg, clavicle, shoulder, foot, ankle, neck, back and rib or a traction pad, candles, toys, cables for power or electronic (telephone) transmission, hydrophone cables for oil exploration at sea and various other uses.

DETAILED DESCRIPTION OF THE INVENTION

As stated above, the present invention provides an oil gel composition which includes, as essential components, at least one hydrogenated anionic block copolymer (to be described in greater detail herein below) and an ester oil (also to be described in greater detail herein below) or a mixture of ester oils.

The oil gel compositions of the present invention are made using conventional procedures well known in the art. Typically, the gel compositions of the present invention are made by blending at least the ester oil with a hydrogenated anionic block copolymer having the controlled distribution block. The blends can be made using any conventional mixing apparatus and mixing can occur at room temperature or at a temperature that is elevated from room temperature. For example, the mixing of the two essential components, together with other optional components (to be described in greater detail below), may be performed at a temperature from about 120° C. to about 175° C.

As stated above, one of the essential components of the inventive oil gel composition is a hydrogenated block copolymer containing mono alkenyl arene end blocks and a unique mid block of a mono alkenyl arene and a conjugated diene, such as described in the '981 application mentioned above. The entire contents of the '981 application, particularly the anionic polymerization method described therein, are thus incorporated herein by reference. Surprisingly, the combination of (1) a unique control for the monomer addition, and (2) the use of diethyl ether or other modifiers as a component of the solvent (which is referred to as a "distribution agent") results in a certain characteristic distribution of the two monomers (herein termed a "controlled distribution" polymerization, i.e., a polymerization resulting in a "controlled distribution" structure), and also results in the presence of certain mono alkenyl arene rich regions and certain conjugated diene rich regions in the polymer block.

For purposes hereof, "controlled distribution" is defined as a molecular structure having the following attributes: (1) terminal regions adjacent to the mono alkenyl arene homopolymer ("A") blocks that are rich in (i.e., having a greater than average amount of) conjugated diene units; (2) one or more regions not adjacent to the A blocks that are rich in (i.e., having a greater than average amount of) mono alkenyl arene units; and (3) an overall structure having relatively low mono alkenyl arene, e.g., styrene, blockiness. For the purposes hereof, "rich in" is defined as greater than the average amount, preferably 5% greater than the average amount. This relatively low mono alkenyl arene blockiness can be shown by either the presence of only a single glass transition temperature (Tg) intermediate between the Tg's of either monomer alone, when analyzed using differential scanning calorimetry ("DSC") thermal methods or via mechanical methods, or as shown via proton nuclear magnetic resonance ("H-NMR") methods. The potential for blockiness can also be inferred from measurement of the UV-visible absorbance in a wavelength range suitable for the detection of polystyryllithium end groups during the polymerization of the B block. A sharp and substantial increase in this value is indicative of a substantial increase in polystyryllithium chain ends. In such a process, this will only occur if the conjugated diene concentration drops below the critical level to maintain controlled distribution polymerization. Any mono alkylene arene monomer, such as, for example, styrene, that is present at this point will add in a blocky fashion. The term "styrene blockiness", as measured by those skilled in the art using proton NMR, is defined to be the proportion of S (i.e., styrene) units in the polymer having two S nearest neighbors on the polymer chain. Although this discussion relates to styrene blockiness, it is appreciated by those skilled in the art that the same holds for any mono alkenyl arene monomer.

The styrene blockiness is determined after using H-1 NMR to measure two experimental quantities as follows: First, the total number of styrene units (i.e., arbitrary instrument units which, when a ratio is taken, cancel out) is determined by integrating the total styrene aromatic signal in the H-1 NMR spectrum from 7.5 to 6.2 ppm and dividing this quantity by 5 to account for the 5 aromatic hydrogens on each styrene aromatic ring.

Second, the blocky styrene units are determined by integrating that portion of the aromatic signal in the H-1 NMR spectrum from the signal minimum between 6.88 and 6.80 to 6.2 ppm and dividing this quantity by 2 to account for the 2 ortho hydrogens on each blocky styrene aromatic ring. The assignment of this signal to the two ortho hydrogens on the rings of those styrene units which have two styrene nearest neighbors was reported in F. A. Bovey, High Resolution NMR of Macromolecules (Academic Press, New York and London, 1972), Chapter 6.

The styrene blockiness is simply the percentage of blocky styrene to total styrene units:

Blocky %=100 times (Blocky Styrene Units/Total Styrene Units)

Expressed thus, Polymer-Bd-S—$(S)_n$—S-Bd-Polymer, where n is greater than zero is defined to be blocky styrene. For example, if n equals 8 in the example above, then the blockiness index would be 80%. It is preferred in the present invention that the blockiness index be less than about 40. For some polymers, having styrene contents of ten weight percent to forty weight percent, it is preferred that the blockiness index be less than about 10.

This controlled distribution structure is very important in managing the strength and Tg of the resulting copolymer, because the controlled distribution structure ensures that there is virtually no phase separation of the two monomers, i.e., in contrast with block copolymers in which the monomers actually remain as separate "microphases", with distinct Tg's, but are actually chemically bonded together. This controlled distribution structure assures that only one Tg is present and that, therefore, the thermal performance of the resulting copolymer is predictable and, in fact, predeterminable. Furthermore, when a copolymer having such a controlled distribution structure is then used as one block in a di-block, tri-block or multi-block copolymer, the relatively higher Tg made possible by means of the presence of an appropriately-constituted controlled distribution copolymer region will tend to improve flow and processability. Modification of certain other properties is also achievable.

In a preferred embodiment of the present invention, the subject controlled distribution copolymer block has two distinct types of regions—conjugated diene rich regions on the ends of the block and a mono alkenyl arene rich region near the middle or center of the block. In particular, a mono alkenyl arene/conjugated diene controlled distribution copolymer block is desired, wherein the proportion of mono alkenyl arene units increases gradually to a maximum near the middle or center of the block and then decreases gradually until the polymer block is fully polymerized.

It is noted that the controlled distribution block of the anionic block copolymers employed in the present invention is not a random block in which the distribution of the monomer unit is statistical, nor is the controlled distribution block a tapered block in which there is a gradual change in the composition of the polymer chain from one monomer unit to another.

Starting materials for preparing the controlled distribution copolymers employed in the present invention include the initial monomers. The alkenyl arene can be selected from styrene, alpha-methylstyrene, para-methylstyrene, vinyl toluene, vinylnaphthalene, and para-butyl styrene or mixtures thereof. Of these, styrene is most preferred and is commercially available, and relatively inexpensive, from a variety of manufacturers. The conjugated dienes that can be used in preparing the anionic block copolymer employed in the present invention are 1,3-butadiene and substituted butadienes, such as, for example, isoprene, piperylene, 2,3-dimethyl-1,3-butadiene, and 1-phenyl-1,3-butadiene, or mixtures thereof. Of these, 1,3-butadiene is most preferred. As used herein, "butadiene" refers specifically to "1,3-butadiene".

As discussed above, the controlled distribution polymer block has diene rich region(s) adjacent to the A block and an arene rich region not adjacent to the A block, and typically near the center of the B block. Typically, the region adjacent to the A block comprises the first 15 to 25% of the block and comprises the diene rich region(s), with the remainder considered to be arene rich. The term "diene rich" means that the region has a measurably higher ratio of diene to arene than the arene rich region. Another way to express this is the proportion of mono alkenyl arene units increases gradually along the polymer chain to a maximum near the middle or center of the block (assuming an ABA structure is being described) and then decreases gradually until the polymer block is fully polymerized. For the controlled distribution block B, the weight percent of mono alkenyl arene is between about 10 percent and about 75.

As used herein, "thermoplastic block copolymer" is defined as a block copolymer having at least a first block of a mono alkenyl arene, such as styrene, and a second block of a controlled distribution copolymer of diene and mono alkenyl arene. The method to prepare this thermoplastic block copolymer is via any of the methods generally known for block polymerizations. The present invention includes as an embodiment a thermoplastic copolymer composition, which may be either a di-block, tri-block copolymer or multi-block composition. In the case of the di-block copolymer composition, one block is the alkenyl arene-based homopolymer block and polymerized therewith is a second block of a controlled distribution copolymer of diene and alkenyl arene. In the case of the tri-block composition, it comprises, as end-blocks the glassy alkenyl arene-based homopolymer and as a mid-block the controlled distribution copolymer of diene and alkenyl arene. Where a tri-block copolymer composition is prepared, the controlled distribution diene/alkenyl arene copolymer can be herein designated as "B" and the alkenyl arene-based homopolymer designated as "A".

The A-B-A, tri-block compositions can be made by either sequential polymerization or coupling. In the sequential solution polymerization technique, the mono alkenyl arene is first introduced to produce the relatively hard aromatic block, followed by introduction of the controlled distribution diene/alkenyl arene mixture to form the mid block, and then followed by introduction of the mono alkenyl arene to form the terminal block. In addition to the linear, A-B-A configuration, the blocks can be structured to form a radial (branched) polymer, $(A-B)_n X$, or both types of structures can be combined in a mixture. Some A-B diblock polymer can be present, but preferably at least about 30 weight percent of the block copolymer is A-B-A or radial (or otherwise branched so as to have 2 or more terminal resinous blocks per molecule) so as to impart strength.

It is also important to control the molecular weight of the various blocks. For an AB diblock, desired block weights are 3,000 to about 60,000 for the mono alkenyl arene A block, and 30,000 to about 300,000 for the controlled distribution conjugated diene/mono alkenyl arene B block. Preferred ranges are 5,000 to 45,000 for the A block and 50,000 to about 250,000 for the B block. For the triblock, which may be a sequential ABA or coupled $(AB)_2 X$ block copolymer, the A blocks should be 3,000 to about 60,000, preferably 5,000 to about 45,000, while the B block for the sequential block should be about 30,000 to about 300,000, and the B blocks (two) for the coupled polymer half that amount. The total average molecular weight for the triblock copolymer should be from about 40,000 to about 400,000, and for the radial copolymer from about 60,000 to about 600,000. These molecular weights are most accurately determined by light scattering measurements, and are expressed as number average molecular weights.

Another important aspect of the anionic block copolymer employed in the present invention is to control the microstructure or vinyl content of the conjugated diene in the controlled distribution copolymer block. The term "vinyl content" refers to a conjugated diene that is polymerized via 1,2-addition (in the case of butadiene—it would be 3,4-addition in the case of isoprene). Although a pure "vinyl" group is formed only in the case of 1,2-addition polymerization of 1,3-butadiene, the effects of 3,4-addition polymerization of isoprene (and similar addition for other conjugated dienes) on the final properties of the block copolymer will be similar. The term "vinyl" refers to the presence of a pendant vinyl group on the polymer chain. When referring to the use of butadiene as the conjugated diene, it is preferred that about 20 to about 80 mol percent of the condensed butadiene units in the copolymer block have 1,2 vinyl configuration as determined by proton NMR analysis, preferably about 30 to about 70 mol percent of the condensed butadiene units should have 1,2-vinyl configuration. This is effectively controlled by varying the relative amount of the distribution agent. As will be appreciated, the distribution agent serves two purposes—it creates the controlled distribution of the mono alkenyl arene and conjugated diene, and also controls the microstructure of the conjugated diene. Suitable ratios of distribution agent to lithium are disclosed and taught in U.S. Pat. Reexamination No. 27,145, which disclosure is incorporated by reference.

In another embodiment of the present invention, and when butadiene is used as the conjugated diene, it is preferred that about 35 to about 55 mol percent of the condensed butadiene units in the copolymer block have 1,2 vinyl configuration as determined by proton NMR analysis. In this particular embodiment of the present invention, the aforementioned range of condensed butadiene in the copolymer block having a 1,2 vinyl configuration enables the hydrogenated block copolymer to have short runs of 1,4 butadiene thus minimizing crystallinity in the hydrogenated polymer.

Another feature of the thermoplastic elastomeric di-block and tri-block polymers of the anionic copolymer employed in the present invention, including one or more controlled distribution diene/alkenyl arene copolymer blocks and one or more mono alkenyl arene blocks, is that they have at least two Tg's, the lower being the combined Tg of the controlled distribution copolymer block which is an intermediate of its constituent monomers' Tg's. Such Tg is preferably at least about −60° C., more preferably from about −40° C. to about +30° C., and most preferably from about −40° C. to about +10° C. The second Tg, that of the mono alkenyl arene "glassy" block, is preferably more than about 80° C., more preferably from about +80° C. to about +110° C. The presence of the two Tg's, illustrative of the microphase separation of the blocks, contributes to the notable elasticity and strength of the material in a wide variety of applications, and its ease of processing and desirable melt-flow characteristics.

In some embodiments of the present invention, a hydrogenated block copolymer that is a linear hydrogenated ABA styrene/butadiene block copolymer having a total molecular weight of about 80,000 to about 200,000 is employed. In another embodiment of the present invention, it is preferred to use an anionic block polymer of the S-EB/S-S type. This formula indicates a polymer having a polystyrene block (S) on both ends of a hydrogenated polybutadiene (EB)/styrene (S) controlled distribution midblock. One example of a preferred S-EB/S-S type polymer is one wherein the molecular weight of the various blocks is 29,000-80,000/50,000-29,000, the % weight styrene is 57.5%, the % weight styrene in the EB/S mid block is 39% and the 1,2/1,4-butadiene ratio is 40/60. Another preferred anionic polymer of the S-EB/S-S type is one wherein the molecular weight of the various blocks is 9,500-60,000/20,000-9,500, the % weight styrene is 39.5%, the % weight styrene in the EB/S mid block is 25% and the 1,2/1,4-butadiene ratio is 40/60. Of these preferred S-EB/S-S type polymers, the first one mentioned above is most preferred.

In yet another embodiment of the present invention, the hydrogenated block copolymer employed is a linear hydrogenated AB diblock polymer wherein A is polystyrene and B is EB/S, i.e., a hydrogenated polybutadiene (EB) / styrene (S) controlled distribution block. In such an embodiment, the polystyrene block (A) has a molecular weight from about 30,000 to about 50,000, with a molecular weight of about 40,000 to about 47,000 being typical, and the EB/S controlled distribution block has a molecular weight from about 60,000 to about 110,000, typically about 80,000 to about 95,000, and a styrene content from about 30 to about 45% by weight, typically about 35 to about 40% by weight. In this particular block copolymer, the EB/S controlled distribution copolymer block typically has a molecular weight of 57,000/33,000 and is selectively hydrogenated to remove at least 90%, typically at least 95%, of the butadiene double bonds. The 1,2/1,4-butadiene ratio is from about 15/85 to about 30/70, typically about 18/82 to about 22/77. The total styrene content of the S-EB/S diblock is from about 50 to about 65, typically about 55 to about 60, % by weight.

The linear hydrogenated AB diblock polymer described in the above paragraph was made utilizing the same basic procedure as described in copending and commonly assigned U.S. patent application Ser. No. 10/359,981, filed Feb. 6, 2003, the contents of which are incorporated herein by reference, except that a low amount of distribution agent was employed. By "low amount", it is meant that the distribution agent was used in an amount of less than 1% by weight. Typically, the distribution agent is diethyl ether and the amount used in forming the aforementioned hydrogenated AB diblock polymer is 0.5% by weight. The low level of distribution agent minimizes the 1,2-butadiene addition (to maximize the backbone length), while assuring minimum tapering during the copolymerization. In this particular diblock, the distribution of styrene is controlled throughout the EB/S block so as to help minimize crystallinity in the polymer.

The anionic block copolymer employed in the present invention is selectively hydrogenated. Hydrogenation can be carried out via any of the several hydrogenation or selective hydrogenation processes known in the prior art. For example, such hydrogenation has been accomplished using methods such as those taught in, for example, U.S. Pat. Nos. 3,494,942, 3,634,594, 3,670,054, 3,700,633 and Reexamination No. 27,145. Typically, hydrogenation is carried out under such conditions that at least about 90 percent of the conjugated diene double bonds have been reduced, and between zero and 10 percent of the arene double bonds have been reduced. Preferred ranges are at least about 95 percent of the conjugated diene double bonds reduced, and more preferably about 98 percent of the conjugated diene double bonds are reduced. Alternatively, it is possible to hydrogenate the polymer such that aromatic unsaturation is also reduced beyond the 10 percent level mentioned above. In that case, the double bonds of both the conjugated diene and arene may be reduced by 90 percent or more.

In an alternative, the block copolymer employed in the present invention may be functionalized in a number of ways. One way is by treatment with an unsaturated monomer having one or more functional groups or their derivatives, such as carboxylic acid groups and their salts, anhydrides, esters, imide groups, amide groups, and acid chlorides. The preferred monomers to be grafted onto the block copolymers are maleic anhydride, maleic acid, fumaric acid, and their derivatives. A further description of functionalizing such block copolymers can be found in U.S. Pat. Nos. 4,578,429 and 5,506,299. In another manner, the selectively hydrogenated block copolymer employed in the present invention may be functionalized by grafting silicon or boron-containing compounds to the polymer as taught, for example, in U.S. Pat. No. 4,882,384. In still another manner, the block copolymer of the present invention may be contacted with an alkoxy-silane compound to form silane-modified block copolymer. In yet another manner, the block copolymer of the present invention may be functionalized by reacting at least one ethylene oxide molecule to the polymer as taught in U.S. Pat. No. 4,898,914, or by reacting the polymer with carbon dioxide as taught in U.S. Pat. No. 4,970,265. Still further, the block copolymers of the present invention may be metallated as taught in U.S. Pat. Nos. 5,206,300 and 5,276,101, wherein the polymer is contacted with an alkali metal alkyl, such as a lithium alkyl. And still further, the block copolymers of the present invention may be functionalized by grafting sulfonic groups to the polymer as taught in U.S. Pat. No. 5,516,831.

The other essential component of the inventive oil gel composition is an ester oil. The term "ester oil" is used herein to describe any non-aromatic ester compound including monoesters, diesters or triesters. An ester as used herein is a compound that includes at least one carboxylate group: R—COO—, where R is hydrogen or a hydrocarbyl radical. The term "hydrocarbyl" is used herein to denote aliphatic or cyclic groups that include elements of C and H having from 1 to about 30 carbon atoms. Aliphatic groups include, for example, alkyl groups, alkenyl groups or alkynyl groups. The hydrocarbyl groups can be substituted with any group as desired, except for, an aromatic group.

Suitable esters that can be employed in the present invention include those of the following formulas:

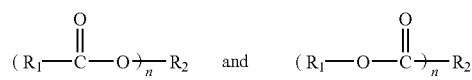

where n has any value from 1 to about 8, and $R_1$ and $R_2$ are the same or different and are hydrogen or a hydrocarbyl (including substituted hydrocarbyls). It is noted that a suitable group for $R_2$ depends on the value of n. It is noted that the sugar esters of fatty acids, such as sucrose esters of fatty acids, are also contemplated herein.

In one embodiment of the present invention, n is 1, and the ester has the formula $R_1C(O)OR_2$ where $R_1$ is a $C_{10}$-$C_{20}$, preferably a $C_{15}$-$C_{18}$, and even more preferably a $C_{17}$, alkyl, and $R_2$ is a lower alkyl radical containing from 1 to 10, preferably 8 carbon atoms.

Another class of suitable esters that may be employed in the present invention is represented by the following formula:

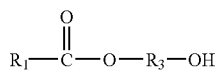

where $R_1$ is defined above and $R_3$ includes alkylene or substituted alkylene.

Still another class of suitable esters that may be employed in the present invention is represented by the following formula:

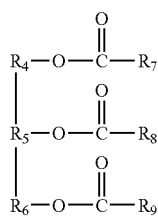

where $R_4$, $R_5$, and $R_6$ individually include alkylene or substituted alkylene; and $R_7$, $R_8$, and $R_9$ individually include hydrogen or a hydrocarbyl.

Preferred esters of the type mentioned above are eicosyl erucate ester or a $C_{12}$-$_{15}$ alkyl octanoate. Examples of other suitable esters include, but are not limited to: acetylline methylsilanol mannuronate; acetaminosalol; acetylated cetyl hydroxyprolinate; acetylated glycol stearate; acetylated sucrose distearate; acetylmethionyl methylsilanol elastinate; acetyl tributyl citrate; acetyl triethyl citrate; acetyl trihexyl citrate; aleurites moluccana ethyl ester; allethrins; allyl caproate; amyl acetate; arachidyl behenate; arachidyl glycol isostearate; arachidyl propionate; ascorbyl dipalmitate; ascorbyl palmitate; ascorbyl stearate; aspartame; batyl isostearate; batyl stearate; bean palmitate; behenyl beeswax; behenyl behenate; behenyl erucate; behenyl isostearate; behenyl/isostearyl beeswax; borago officinalis ethyl ester; butoxyethyl acetate; butoxyethyl nicotinate; butoxyethyl stearate; butyl acetate; butyl acetyl ricinoleate; 2-t-butylcyclohexyl acetate; butylene glycol dicaprylate/dicaprate; butylene glycol montanate; butyl ester of ethylene/MA copolymer; butyl ester of PVNI copolymer; butylglucoside caprate; butyl isostearate; butyl lactate; butyl methacrylate; butyl myristate; butyloctyl beeswax; butyloctyl candelillate; butyloctyl oleate; butyl oleate; butyl PABA; butylparaben; butyl stearate; butyl thioglycolate; butyroyl trihexyl citrate; $C_{18-36}$ acid glycol ester; $C_{12-20}$ acid PEG-8 ester; calcium stearoyl lactylate; $C_{18-28}$ alkyl acetate; $C_{18-38}$ alkyl beeswax; $C_{30-50}$ alkyl beeswax; $C_{20-40}$ alkyl behenate; $C_{18-38}$ alkyl $C_{24-54}$ acid ester; $C_8$ alkyl ethyl phosphate; $C_{18-38}$ alkyl hydroxystearoyl stearate; $C_{12-13}$ alkyl lactate; $C_{12-15}$ alkyl lactate; $C_{12-13}$ alkyl octanoate; $C_{12-15}$ alkyl octanoate; $C_{18-36}$ alkyl stearate; $C_{20-40}$ alkyl stearate; $C_{30-50}$ alkyl stearate; $C_{40-60}$ alkyl stearate; caproyl ethyl glucoside; caprylyl butyrate; $C_{10-30}$ cholesterol/lanoster-ol esters; cellulose acetate; cellulose acetate butyrate; cellulose acetate propionate; cellulose acetate propionate carboxylate; Ceteareth-7 stearate; cetearyl behenate; cetearyl candelillate; cetearyl isononanoate; cetearyl octanoate; cetearyl palmitate; cetearyl stearate; cetyl acetate; acetyl ricinoleate; cetyl caprylate; cetyl $C_{12-15}$-Pareth-9 carboxylate; cetyl glycol isostearate; cetyl isononanoate; cetyl lactate; cetyl laurate; cetyl myristate; cetyl octanoate; cetyl oleate; cetyl palmitalte; cetyl PCA; cetyl PPG-2 Isodeceth-7 carboxylate; cetyl ricinoleate; cetyl stearate; $C_{16-20}$ glycol isostearate; $C_{20-30}$ glycol isostearate; $C_{14-16}$ glycol palmitate; chimyl isostearate; chimyl stearate; cholesteryl acetate; cholesteryl/behenyl/octyldodecyl lauroyl glutamate; cholesteryl butyrate; cinoxate; citronellyl acetate; coco-caprylate/caprate; coco rapeseedate; cocoyl ethyl glucoside; corylus avellanna ethyl ester; $C_{12-15}$ Pareth-9 hydrogenated tallowate; $C_{11-15}$ Pareth-3 oleate; $C_{12-15}$ Pareth-12 oleate; $C_{11-15}$ Pareth-3 stearate; $C_{11-15}$ Pareth-12 stearate; decyl isostearate; decyl myristate; decyl oleate; decyl succinate; DEDM hydantoin dilaurate; dextrin behenate; dextrin laurate; dextrin myristate; dextrin palmitate; dextrin stearate; diacetin; dibutyl adipate; dibutyl oxalate; dibutyl sebacate; di-$C_{12-15}$ alkyl adipate; di-$C_{12-15}$ alkyl fumarate; di-$C_{12-13}$ alkyl malate; di-$C_{12-13}$ alkyl tartrate; di-$C_{14-15}$ alkyl tartrate; dicapryl adipate; dicaprylyl maleate; dicetearyl dimer dilinoleate; dicetyl adipate; dicetyl thiodipropionate; dicocoyl pentaerythrilyl distearyl citrate; diethoxyethyl succinate; diethyl acetyl aspartate; diethylaminoethyl cocoate; diethylaminoethyl PEG-5 cocoate; diethylaminoethyl PEG-5 laurate; diethylaminoethyl stearate; diethyl aspartate; diethylene glycol diisononanoate; diethylene glycol dioctanoate; diethylene glycol dioctanoate/diisononanoate; diethyl glutamate; diethyl oxalate; diethyl palmitoyl aspartate; diethyl sebacate; diethyl succinate; digalloyl trioleate; diglyceryl stearate malate; dihexyl adipate; dihexyldecyl lauroyl glutamate; dihydroabietyl behenate; dihydroabietyl methacrylate; dihydrocholesteryl butyrate; dihydrocholesteryl isostearate; dihydrocholesteryl macadamiate; dihydrocholesteryl nonanoate; dihydrocholesteryl octyldecanoate; dihydrocholesteryl oleate; dihydrophytosteryl octyldecanoate; dihydroxyethylamino hydroxypropyl oleate; dihydroxyethyl soyamine dioleate; diisobutyl adipate; diisobutyl oxalate; diisocetyl adipate; diisodecyl adipate; diisopropyl adipate; diisopropyl dimer dilinoleate; diisopropyl oxalate; diisopropyl sebacate; diisostearamidopropyl epoxypropylmonium chloride; diisostearyl adipate; diisostearyl dimer dilinoleate; diisostearyl fumarate; diisostearyl glutarate; diisostearyl malte; dilaureth-7 citrate; dilauryl thiodipropionate; dimethicone copolyol acetate; dimethicone copolyol adipate; dimethicone copolyol almondate; dimethicone copolyol beeswax; dimethicone copolyol behenate; dimethicone copolyol borageate; dimethicone copolyol cocoa butterate; dimethiccne copolyol dhupa butterate; dimethicone copolyol hydroxystearate; dimethicone copolyol isostearate; dimethicone copolyol kokum butterate; dimethicone copolyol lactate; dimethicone copolyol laurate; dimethicone copolyol mango butterate; dimethicone copolyol meadowfoamate; dimethicone copolyol mohwa butterate; dimethicone copolyol octyldodecyl citrate; dimethicone copolyol olivate; dimethicone copolyol sal butterate; dimethicone copolyol shea butterate; dimethicone copolyol stearate; dimethicone copoly undecylenate; dimethiconol beeswax; dimethiconol behenate; dimethiconol borageate; dimethiconol dhupa butterate; dimethiconol fluoroalcohol dillnoleic acid; dimethiconol hydroxystearate; dimethiconol illipe butterate; dimethiconol isostearate; dimethiconol kokum butterate; dimethiconol lactate; di methiconol mohwa butterate; dimethiconol sal butterate; dimethiconol stearate; dimethyl adipate; dimethylaminoethyl methacrylate; dimethyl brassylate; dimethyl cystinate; dimethyl glutarate; dimethyl maleate; dimethyl oxalate; dimethyl succinate; dimyristyl tartrate; dimyristyl thiodipropionate; dinonoxynol-9 citrate; dioctyl adipate; dioctyl butamido triazone; dioctyl dimer dilinoleate; dioctyldodeceth-2 lauroyl glutamate; dioctyldodecyl adipate; dioctyldodecyl dimer dilinoleate; dioctyldodecyl dodecanedioate; dioctyldodecyl fluoroheptyl citrate; dioctyldodecyl lauroyl glutamate; dioctyldodecyl stearoyl dimer dilinoleate; dioctyldodecyl stearoyl glutamate; diocty fumarate; dioctyl malate; dioctyl maleate; dioctyl sebacate; dioctyl succinate; dioleoyl edetolmonium methosulfate; dipalmitoyl hydroxyproline; dipentaerythrityl hexacaprylate/hexacaprate; dipentaerythrityl hexaheptanoate/hexacaprylate/hexacaprate; dipentaerythrityl hexahydroxystearate; dipentaerythrityl hexahydroxystearate/stearate/rosinate; dipentaerythrityl hexaoctanoate/behenate; dipentaerythrityl pentahydroxystearate/isostearat-e; dipropyl adipate; dipropylene glycol caprylate; dipropylene dipropyl oxalate; disodium laureth-7 citrate; disodium PEG-5 laurylcitrate sulfosuccinate; disodium PEG-8 ricinosuccinate; disodium succinoyl glycyrrhetinate; disodium 2-sulfolaurate; disteareth-2 lauroyl glutamate; disteareth-5 lauroyl glutamate; distearyl thiodipropionate; ditallowoylethyl hydroxyethylmonium methosulfate; ditridecyl adipate; ditridecyl dimer dilinoleate; ditridecyl thiodipropionate; dodecyl gallate; erucyl arachidate; erucyl erucate; erucyl oleate; ethiodized oil; ethoxydiglycol acetate; ethoxyethanol acetate; ethyl almondate; ethyl apricot kemelate; ethyl arachidonate; ethyl aspartate; ethyl avocadate; ethyl biotinate; ethyl butylacetylaminopropionate; ethyl cyanoacrylate; ethyl cycolhexyl propionate; ethyl digyhdroxypropyl paba; ethylene brassylate; ethylene carbonate; ethy ester of hydrolyzed animal protein; ethyl ester of hydrolyzed keratin; ethyl ester of hydrolyzed silk; ethyl ester of pvm/ma copolymer; ethyl ferulate; ethyl glutamate; ethyl isostearate; ethyl lactate; ethyl laurate; ethyl linoleate; ethyl linolenate; ethyl niethacrylate; ethyl methylphenylglycidate; ethyl minkate; ethyl morrhuate; ethyl myristate; ethyl nicotinate; ethyl oleate; ethyl olivate; ethyl paba ethyl palmitate; ethylparaben; ethyl pelargonate; ethyl persate; ethyl phenylacetate; ethyl ricinoleate; ethyl serinate; ethyl stearate; ethyl thioglycolate; ethyl urocanate; ethyl wheat germate; ethyl ximenynate; Itocrylene; famesyl acetate; galactonolactone; galbanum (ferula galbaniflua) oil; gamrnma-nonalacione; geranyl acetate; glucarolactone; glucose glutamate; glucose pentaacetate; glucuronolactone; glycereth-7 diisononanoate; glycereth-8 hydroxystearate; glycereth-5 lactate; glycereth-25 PCA isostearate; glycereth-7 triacetate; glyceryl triacetyl hydroxystearate; glyceryl triacetyl ricinoleate; glycolamide stearate; glycol/butylene glycol montanate; glycol catearate; glycol dibehenate; glycol dilaurate; glycol dioctanoate; glycol dioleate; glycol distearate; glycol ditallowate; glycol hydroxystearate; glycol montanate; glycol octanoate; glycol oleate; glycol palmitate; glycol ricinoleate; glycol stearate; glycol stearate SE; glycyrrhetinyl stearate; hexacosyl glycol isostearate; hexanediol beeswax; hexanediol distearate; hexanetriol beeswax; hexyldecyl ester of hydrolyzed collagen; hexyldecyl isostearate; hexyldecyl laurate; hexyldecyl octanoate; hexyldecyl oleate; hexyldecyl palmitate; hexyldecyl stearate; hexyl isostearate; hexyl laurate; hexyl nicotinate; homosalate; hydrogenated castor oil hydroxystearate; hydrogenated castor oil isostearate; hydrogenated castor oil lauirate; hydrogenated castor oil stearate; hydrogenated castor oil triisostearate; hydrogenated methyl abietate; hydrogenated rosin; hydroquinone pca; hydroxycetyl isostearate; hydroxyoctacosanyl hydroxystearate; inositol hexa-pca; iodopropynyl butylcarbamate; isoamyl acetate; isoamyl laurate; isobutylated lanolin oil; isobutyl myristate; isobutyl palmitate; isobutylparaben; isobutyl pelargonate; isobutyl stearate; isobutyl tallowate; isoceteareth-8 stearate; isoceteth-10 stearate; isocetyl behenate; isocetyl isodecanoate; isocetyl isostearate; isocetyl laurate; isocetyl linoleoyl stearate; isocetyl myristate:, isocetyl octanoate; isocetyl palmitate; isocetyl stearate; isocetyl stearoyl stearate; isodeceth-2 cocoate; isodecyl citrate; isodecyl cocoate; isodecyl hydroxystearate; isodecyl isononanoale; isodecyl laurate; isodecyl myristate; isodecyl neopentanoate; isodecyl octanoate; isodecyl oleate; isodecyl palmitate; isodecylparaben; isodecyl stearate; isohexyl laurate; isohexyl neopentanoate; isohexyl palmitate; isolauryl behenate; isomerized jojoba oil; isononyl ferulate; isooctyl thioglycolate; isopropyl arachidate; isopropyl avocadate; isopropyl behenate; isopropyl citrate; isopropyl $C_{12-15}$-pareth-9 carboxylate; isopropyl hydroxystearate; isopropyl isostearate; isopropyl jojobate; isopropyl lanolate; isopropyl laurate; isopropyl linoleate; isopropyl myristate; isopropyl oleate; isopropylparaben; isopropyl PPG-2-isodeceth-7 carboxylate; isopropyl ricinoleate; isopropyl sorbate; isopropyl stearate; isopropyl tallowate; isopropyl thioglycolate; isosorbide laurate; isosteareth-10 stearate; isostearyl avocadate; isostearyl behenate; isostearyl erucate; isostearyl isononanoate; iscstearyl isostearate; isostearyl isostearoyl stearate; isostearyl lactate; isostearyl laurate; isostearyl myristate; isostearyl neopentanoate; isostearyl octanoate; isostearyl palmitate; isostearyl stearoyl stearate; isotridecyl isononanoate; isotridecyl laurate; isotridecyl myristate; jojoba (buxus chinensis) oil; jojoba esters; kojic dipalmitate; laneth-9 acetate; laneth-10 acetate; laneth-4 phosphate; lanolin linoleate; lanolin ricinoleate; laureth-2 acetate; laureth-6 citrate; laureth-7 citrate; laureth-2 octanoate; laureth-7 tartrate; lauroyl ethyl glucoside; lauroyl lactylic acid; lauryl behenate; lauryl cocoate; lauryl isostearate; lauryl lactate; lauryl methacrylate; lauryl myristate; lauryl octanoate; lauryl oleate; lauryl palmitate; lauryl stearate; linalyl acetate; linoleyl lactate; madecassicoside; mannitan laurate; mannitan oleate; menthyl acetate; menthyl anthranilate; menthyl lactate; menthyl pca; methoxyisopropyl acetate; methoxyPEG-7 rutinyl succinate; methyl acetyl ricinoleate; methyl anthranilate; methyl behenate; methyl caproate; methyl caprylate; methyl caprylate/caprate; methyl cocoate; 6-methyl coumarin; methyl dehydroabietate; methyl dihydroabietate; methyldihydrojasmonate; methyl glucose dioleate; methyl glucose isostearate; methyl glucose laurale; methyl glucose sesquicaprylate/sesquicaprate; methyl glucose sesquicocoate; methyl glucose sesquiisostearate; methyl glucose sesquilaurate; methyl glucose sesquioleate; methyl glucose sesquistearate; methyl glycyrrhizate; methyl hydrogenated rosinate; methyl hydroxystearate; methyl isostearate; methyl laurate; methyl linoleate; methyl 3-methylresorcylate; methyl myristate; methyl nicotinate; methyl oleate; methyl palmate; methyl palmitate; methylparaben; methyl pelargonate; methyl ricinoleate; methyl rosinate; methylsilanol acetylmethionate; methylsilaiaol carboxymethyl theophylline; methylsilanol carboxymethyl theophylline alginate; methylsilanol hydroxyproline; methylsilanol hydroxyproline aspartate; methylsilanol mannuronate; methylsilanol pca; methyl soyate; methyl stearate; methyl thioglycolate; monosaccharide lactate condensata; myreth-3 caprate; myreth-3 laurate; myreth-2 myristate; myreth-3 myristate; myreth-3 octanoate; myreth-3 palmitate; myristoyl ethyl glucoside; myristoyl lactylic acid; myristyl isostearate; myristyl lactate; myristyl lignocerate; myristyl myristate; myristyl octanoate; myristyl propionate; myristyl stearate; neopentyl glycol dicaprate; neopentyl glycol dicaprylate/dicaprate; neopentyl glycol dicaprylate/dipelargonate/dicaprate; neopentyl glycol diheptanoate; neopentyl glycol diisostearate; neopentyl glycol dilaurate; neopentyl glycol dioctanoate; nonyl acetate; nopyl acetate; octacosanyl glycol isostearate; octocrylene; octyl acetoxystearate; octyl caprylate/caprate; octyl cocoate; octyldecyl oleate; octyldodecyl behenate; octyldodecyl erucate; octyldodecyl hydroxystearate; octyldodecyl isostearate; octyldodecyl lactate; octyldodecyl lanolate; octyldodecyl meadowfoamate; octyldodecyl myristate; octyldodecyl neodecanoate; octyldodecyl neopentanoate; octyldodecyl octanoate; octyldodecyl octyldodecanoate; octyldodecyl oleate; octyldodecyl olivate; octyldodecyl ricinoleate; octyldodecyl stearate; octyldodecyl steroyl stearate; octyl gallate; octyl hydroxystearate; octyl isononanoate; octyl isopalmitate; octyl isostearate; octyl laurate; octyl linoleayl stearate; octyl myristate; octyl neopentanoate; octyl octanoate; octyl oleate; octyl palmitate; octyl PCA; octyl pelagonate; octyl stearate; oleoyl ethyl glucoside; oleyl acetate; oleyl arachidate; oleyl erucate; oleyl ethyl phosphate; oleyl lactate; oleyl lanolate; oleyl linoleate; oleyl myristate; oleyl oleate; oleyl phosphate; oleyl stearate; oryzanol; ozonized jojoba oil; palmitoyl carniline; palmitoyl inulin; palmitoyl myristyl serinate; pantethine; panthenyl ethyl ester acetate; panthenyl triacetate; pca glyceryl oleate; pea palmitate; PEG-18 castor oil dioleate; PEG-5 DMDM hydantoin oleate; PEG-15 dmdm hydantoin stearate; PEG-30 dipolyhydroxystearate; PEG-20 hydrogenated castor oil isostearate; PEG-50 hydrogenated castor oil isostearate; PEG-20 hydrogenated castor oil triisostearate; PEG-20 mannitan laurate; PEG-20 methyl glucose distearate; PEG-80 methyl glucose laurate; PEG-20 methyl glucose sesquicaprylate/sescquicaprate; PEG-20 methyl glucose sesquilaurate; PEG-5 oleamide dioleate; PEG-150 pentaerythrityl tetrastearate; PEG-3/PPG-2 glyceryl/sorbitol hydroxystearate/isostearate; PEG-4 proline linoleate; PEG-4 proline linolenate; PEG-8 propylene glycol cocoate; PEG-55 propylene glycol oleate; PEG-25 propylene glycol stearate; PEG-75 propylene glycol stearate; PEG-120 propylene glycol stearate; PEG40 sorbitol hexaoleate; PEG-50 sorbitol hexaoleate; PEG-30 sorbitol tetraoleate laurate; PEG-60 sorbitol tetrastearate; PEG-5 tricapryl citrate; PEG-5 tricetyl citrate; PEG-5 trilauryl citrate; PEG-5 trimethylolpropane trimyristate; PEG-5 trimyristyl citrate; PEG-5 tristeaiyl citrate; PEG-6 undecylenate; pentadecalacione; pentaerythrityl dioleate; pentaerythrityl distearate; pentaerythrityl hydrogenated rosinate; pentaerythrityl isostearate/caprate/caprylate/adipate; pentaerythrityl rosinate; pentaerythrityl stearate; pentaerythrityl stearate/caprate/caprylate/adipate; pentaerythrityl stearate/lsostearate/adipate/hydroxystearate; pentaerythrityl tetraabietate; pentaerythrityl tetraacetate; pentaerityl tetrabehenate; petaerythrityl tetracaprylate/tetracaprate;; pentaerythrityl tetracocoate; pentaerythrityl tetraisononanoate; pentaerythrityl tetralaurate; pentaerythrityl tetramyristate; pentaerythrityl tetraoctanoate; pentaerythrityl tetraoleate; pentaerythrityl tetrapelargonate; petaerythrityl tetrastearate; pentaerythrityl trioleate; phenoxyethylparaben; phylosteryl macadamiate; potassium butylparaben; potassium deceth-4 phosphate; potassium ethylparaben; potassiuim methylparaben; potassium propylparaben; PPG-2 isoceleth-20 acetate; PPG-14 laureth-60 alkyl dicarbamate; PPG-20 methyl glucose ether acetate; PPG-20 methyl glucose ether distearate; PPG-2 myristyl ether propionate; PPG-14 palmeth-60 alkyl dicarbamate; pregnenolone acetate; propylene glycol alginate; propylene glycol behenate; propylene glycol caprylate; propylene glycol Ceteth-3 acetate; propylene glycol Ceteth-3 propionate; propylene glycol citrate; propylene glycol cocoate; propylene glycol dicaprate; propylene glycol dicaproate; propylene glycol dicaprylate; propylene glycol dicocoate; propylene glycol diisononanoate; propylene glycol diisostearate; propylene glycol dilaurate; propylene glycol dioctanoate; propylene glycol dioleate; propylene glycol dipelargonate; propylene glycol distearate; propylene glycol diundecanoate; propylene glycol hydroxystearate; propylene glycolisoceteth-3 acetate; propylene glycol isostearate; propylene glycol laurate; propylene glycol linoleate; propylene glycol linolenate; propylene glycol myristate; propylene glycol myristyl ether acetate; propylene glycol oleate; propylene glycol oleate se; propylene glycol ricinoleate; propylene glycol soyate; propylene glycol stearate; propylene glycol stearate se; propyl gallate; propylparaben; pyricarbate; pyridoxine dicaprylate; pyridoxine dilaurate; pyridoxine dioctenoate; pyridoxine dipalmitate; pyridoxine glycyrrhetinate; pyridoxine tripalmitate; raffmose myristate; raffinose oleate; resorcinol acetate; retinyl acetate; retinyl linoleate; retinyl palmitate; retinyl propionate; riboflavin tetraacetate; ribonolaclone; siloxanetriol phytate; silybum marianum ethyl ester; sodium behenoyl lactylate; sodium butylparaben; sodium caproyl lactylate; sodiumn cocoyl lactylate; sodium dilaureth-7 citrate; sodium ethylparaben; sodium ethyl 2-sulfolaurate; sodium isostearoyl lactylate; sodium laureth-7 tartrate; sodium lauroyl lectylate; sodium methylparaben; sodium methyl 2-sulfolaurate; sodium oleoyl lactylate; sodium panteheine sulfonate; sodium phytate; sodium propylparaben; sodium stearoyl lactylate; sorbeth-2 cocoate; sorbeth-6 hexastearate; sorbeth-3 isostearate; sorbityl acetate; soybean palmitate; soy sterol acetate; stearamide dea-distearate; stearamide diba-stearate; stearamide mea-stearate; steareth-5 stearate; stearoyl lactylic acid; stearyl acetate; stearyl acetyl glutamate; stearyl beeswax; stearyl behenate; stearyl caprylate; stearyl citrate; stearyl erucate; stearyl glycol isostearate; stearyl glycyrrhetinate; stearyl heptanoate; stearyl lactate; stearyl linoleate; stearyl octanoate; stearyl stearalte; stearyl stearoyl stearate; sucrose cocoate; sucrose dilaurate; sucrose distearate; sucrose laurate; sucrose myristate; sucrose octaacetate; sucrose oleate; sucrose palmitate; sucrose polybehenate; sucrose polycottonseedate; sucrose polylaurate; sucrose polylinoleate; sucrose polypalmate; sucrose polysoyate; sucrose polystearate; sucrose ricinoleate; sucrose stearate; sucrose tetrastearate triacetate; sucrose tribehenate; sucrose tristearate; tallowoyl ethyl glucoside; tannic acid; TEA-lauroyl lactylate; telmesteine; terpineol acetate; tetradecyleicosyl stearate; tetrahexyldecyl ascorbate; tetrahydrofurfuryl ricinoleate; tocophersolan; tocopheryl acetate; tocopheryl linoleate; tocopheryl linoleate/oleate; tocopheryl nicotinate; tocopheryl succinate; tributyl citrate; tri-$C_{12\text{-}13}$ alkyl citrate; tri-$C_{14\text{-}15}$ alkyl citrate; tricaprylyl citrate; tridecyl behenate; tridecyl cocoate; tridec), erucate; tridecyl isononanoate; tridecyl laurate; tridecyl myristate; tridecyl neopentanoate; tfridecyl octanoate; tridecyl stearate; tridecyl stearoyl stearate; tridecyl trimellitate; triethylene glycol hydrogenated rosinate; trihexyldecyl citrate; triisocetyl citrate; triisopropyl trilinoleate; triisostearyl citrate; triisostearyl trilinoleate; trilactin; trilauryl citrate; trimethylolpropane tricaprylate/tricaprate; trimethylolpropane tricocoate; trimethylolpropane trilaurate; trimethylalpropane trioctanoate; trimethylolpropane tristearate; trimethyl pentanyl diisobutyrate; trioctyl citrate; trioctyldodecyl borate; trictyl trimellitate; trioleyl citrate; tripaba panthenol; tripropylene glycol citrate; tristearyl citrate; tristearyl phosphate; and yeast palmitate.

In a preferred embodiment, the ester oils are natural product oils that are typically found in animal or plant tissues, including those which have been hydrogenated to eliminate or reduce unsaturation. These natural product oils that can be employed in the present invention include compounds that have the following formula:

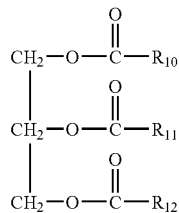

where $R_{10}$ $R_{11}$ and $R_{12}$ may be the same or different fatty acid radicals containing from 8 to 22 carbon atoms.

Suitable natural product oils of the above formula that can be employed in the present invention include, but are not limited to: Kernel Oil; Argania Spinosa Oil; Argemone Mexicana Oil; Avocado (*Persea Gratissima*) Oil; Babassu (*Orbignya Olelfera*) Oil; Balm Mint (*Melissa Officinalis*) Seed Oil; Bitter Almond (*Prunus Amygdalus Amara*) Oil; Bitter Cherry (*Prunus Cerasus*) Oil; Black Currant (*Ribes Nigrrrm*) Oil; Borage (*Borago Officinalis*) Seed Oil; Brazil (*B3ertholletia Excelsa*) Nut Oil; Burdock (*Arctium Lappa*) Seed Oil; Butter; $C_{12-18}$ Acid Triglyceride; Calophyllurn Tacamahaca Oil; Camellia Kissi Oil; Camellia Oleifera Seed Oil; Canola Oil; Caprylic/Capric/Liuric Triglyceride; Caprylic/Capric/Linoleic Triglyceride; Caprylic/Capric/Myristic/Stearic Triglyceride; Caprylic/Capric/Stearic Triglyceride; Caprylic/Capric Triglyceride; Caraway (*Canimn Carvi*) Seed Oil; Carrot (*Daucus Carota Sativa*) Oil; Cashew (*Anacardium Occidentale*) Nut Oil; Castor (*Ricinus Communis*) Oil; Cephalins; Chaulmoogra (*Taraktogenos Kurzii*) Oil, Chia (*Salvia Hispanica*) Oil; Cocoa (*Theobrama Cocao*) Butter; Coconut (*Cocos Nucifera*) Oil; Cod Liver Oil; Coffee (*Coffea Arabica*) Oil; Corn (*Zea Mays*) Germ Oil; Corn (*Zea Mays*) Oil; Cottonseed (*Gossypium*) Oil; $C_{10-18}$ Triglycerides; Cucumber (*Cucumis Sativus*) Oil; Dog Rose (*Rosa Canina*) Hips Oil; Egg Oil; Emu Oil; Epoxidized Soybean Oil; Evening Primrose (*Oenothera Biennis*) Oil; Fish Liver Oil; Gevuina Avellana Oil; Glyceryl Triacetyl Hydroxystearate; Glyceryl Triacetyl Ricinoleate; Glycolipids; Glycosphingolipids; Goat Butter; Grape (*Vitis Vinifera*) Seed Oil; Hazel (*Croylus Americana*) Nut Oil; Hazel (*Corylus Aveilana*) Nut Oil; Human Placental Lipids; Hybrid Safflower (*Ceathamus Tinctorius*) Oil; Hybrid Sunflower (*Helianthus Annuus*) Seed Oil; Hydrogenated Canola Oil; Hydrogenated Castor Oil; Hydrogenated Castor Oil Laurate; Hydrogenated Castor Oil Triisostearate; Hydrogenated Coconut Oil; Hydrogenated Cottonseed Oil; Hydrogenated $C_{12-18}$ Triglycerides; Hydrogenated Fish Oil; Hydrogenated Lard; Hydrogenated Menhaden Oil; Hydrogenated Milk Lipids; Hydrogenated Mink Oil; Hydrogenated Olive Oil; Hydrogenated Orange Roughy Oil; Hydrogenated Palm Kernel Oil; Hydrogenated Palm Oil; Hydrogenated Peanut Oil; Hydrogenated Rapeseed Oil; Hydrogenated Shark Liver Oil; Hydrogenated Soybean Oil; Hydrogenated Tallow; Hydrogenated Vegetable Oil; Isatis Tinctoria Oil; Job's Tears (*Coix Lacryma-Jobi*) Oil; Jojoba Oil; Kiwi (*Actinidia Chinensis*) Seed Oil; Kukui (*Aleurites Moluccana*) Nut Oil; Lard; Lauric/Palmitic/Oleic Triglyceride; Linseed (*Linum Usitatissiumum*) Oil; Lupin (*Lupinus Albus*) Oil; Macadamia Nut Oil; Macadamia Ternifolia Seed Oil; Macadamia Integrifolia Seed Oil; Maleated Soybean Oil; Mango (*Mangifera Indica*) Seed Oil; Marmot Oil; Meadowfoam (*Limnanthes fragraAlba*) Seed Oil; Menhaden Oil; Milk Lipids; Mink Oil; Moringa Pterygosperma Oil; Mortierella Oil; Musk Rose (*Rosa Moschata*) Seed Oil; Neatsfoot Oil; Neem (*Melia Azadirachta*) Seed Oil; Oat (*Avena Sativa*) Kernel Oil; Oleic/Linoleic Triglyceride; Oleic/Palmitic/Lauric/Myristic/L-inoleic Triglyceride; Oleostearine; Olive (*Olea Europaea*) Husk Oil; Olive (*Olea Europaea*) Oil; Omental Lipdis; Orange Roughy Oil; Ostrich Oil; Oxidized Corn Oil; Palm (*Elaeis Guineensis*) Kernel Oil; Palm (*Elaeis Guineensis*) Oil; Passionflower (*Passiflora Edulis*) Oil; Peach (*Prunus Persica*) Kernel Oil; Peanut (*Arachis Hypogaea*) Oil; Pecan (*Caiya Illinoensis*) Oil; Pengawar Djambi (*Cibotium Barometz*) Oil; Phospholipids; Pistachio (*Pistacia Vera*) Nut Oil; Placental Lipids; Poppy (*Papaver Orientale*) Oil; Pumpkin (*Cucurbita Pepo*) Seed Oil; Quinoa (*Chenopodium Quinoa*) Oil; Rapeseed (*Brassica Campestris*) Oil; Rice (*Oryza Sativa*) Bran Oil; Rice (*Oryza Sativa*) Germ Oil; Safflower (*Carthamus Tinctorius*) Oil; Salmon Oil; Sandalwood (*Santalum Album*) Seed Oil; Seabuchthom (*Hippophae Rhamnoides*) Oil; Sesame (*Sesamum Indicum*) Oil; Shark Liver Oil; Shea Butter (*Butyrospermum Parkii*); Silk Worm Lipids; Skin Lipids; Soybean (*Glycine Soja*) Oil; Soybean Lipid; Sphingolipids; Sunflower (*Helianthus Annuus*) Seed Oil; Sweet Almond (*Prunus Amygdalus Dulcis*) Oil; Sweet Cherry (*Prunus Avium*) Pit Oil; Tali Oil; Tallow; Tea Tree (*Melaleuca Altemifolia*) Oil; Telphairia Pedata Oil; Tomato (*Solanum Lycopersicum*) Oil; Triarachidin; Tiibehenin; Tricaprin; Tricaprylin; Trichodesma Zeylanicum Oil; Trierucin; Triheptanoin; Triheptylundecanoin; Trihydroxymethoxystearin; Trihydroxystearin; Triisononanoin; Triisopalmitin; Triisostearin; Trilaurin; Trilinolein; Trilinolenin; Trimyristin; Trioctanoin; Triolein; Tripalmitin; Tripalmitolein; Triricinolein; Trisebacin; Tristearin; Triundecanoin; Tuna Oil; Vegetable Oil; Walnut (*Juglans Regia*) Oil; Wheat Bran Lipids; and Wheat (*Triticum Vulgare*) Germ Oil. In some preferred embodiments, the natural oil product is soybean oil, coconut oil, rapeseed oil or olive oil.

The amount of natural oil that can be employed in the present invention varies from about 250 to about 2000 parts by weight per 100 parts by weight rubber, or block copolymer, preferably about 400 to about 1000 parts by weight.

In some embodiments, particularly when linear hydrogenated AB diblock polymer mentioned above is employed, the non-aromatic ester oil is a oil that is typically employed as PVC plasticizers. Such PVC plasticizing oils include, for example, 2,2,4-trimethyl-1,3-pentanediol diisobutyrate, trimethylolpropane tricaprylate, and bis-2-ethylhexyl sebacate Other non-aromatic ester oils that are aliphatic and are typically used as plastizers are also contemplated herein. One highly preferred composition is the linear hydrogenated AB diblock polymer mentioned above and trimethylolpropane tricaprylate.

The inventive gel composition may also include various types of fillers and pigments to pigment the gel and reduce cost. Suitable fillers include calcium carbonate, clay, talc, silica, zinc oxide, titanium dioxide and the like. The amount of filler employed in the present invention usually is in the range of 0 to 30% weight based on the solvent free portion of the formulation, depending on the type of filler used and the application for which the gel is intended. An especially preferred filler is titanium dioxide.

Another contemplated component of the oil gel composition of the present invention is a polyolefin homopolymer, branched homopolymer, or copolymer. These ingredients can be used to increase the hardness and tear strength of the gel. Preferred polyolefins are polyethylenes and copolymers of polyethylenes with monoalkenyl comonomers including, but not limited to: propylene, butylene, octene, styrene and the like. The melt index of these polymers can range from less than 1 to more than 3,000 measured at 190° C. Examples are low density polyethylenes made with Zeigler-Natta catalysts such as Epolene® C-10 from Eastman Chemical with a density of 0.906 and a melt flow of 2,250 to metallocene linear low density polyethylenes such as Exact® 4023 from Exxon Mobil Chemical with a melt index of 35 and a density of 0.882 and styrene ethylene copolymers such as 2900TE® made by Dow Chemical which contains 34% styrene. Polyolefins will typically be added from 0 to 100 parts per hundred weight rubber, preferably 10 to 50 parts per hundred weight rubber.

The oil gel compositions of the present invention may be modified further with the addition of other polymers, fillers, reinforcements, antioxidants, stabilizers, fire retardants, anti blocking agents, suntan screens, lubricants and other rubber and plastic compounding ingredients without departing from the scope of this invention. Such components are disclosed in various patents including, for example, U.S. Pat. Nos. 3,239,478 and 5,777,043, the disclosures of which are incorporated by reference.

The gels of the present invention can be used for a variety of purposes, such as those disclosed, for example, in U.S. Pat. Nos. 5,336,708, 5,334,646, and 4,798,853. These include, among other uses, as a vibration damper, a vibration isolator, a wrapper, a hand exerciser, a dental floss, a crutch cushion, a cervical pillow, a bed wedge pillow, a leg rest cushion, a neck cushion, a mattress, a bed pad, an elbow pad, a dermal pad, a wheelchair cushion, a helmet liner, a hot or cold compress pad, an exercise weight belt, an orthopedic shoe sole, a splint, sling or brace cushion for the hand, wrist, finger, forearm, knee, leg, clavicle, shoulder, foot, ankle, neck, back and rib or a traction pad. Other uses include in candles, toys, cables for power or electronic (telephone) transmission, hydrophone cables for oil exploration at sea, greases, oil field drilling fluids, and other various uses.

The following examples are provided to illustrate the inventive oil gel composition. These examples are merely exemplary and are not intended to limit the scope of the invention. Amounts are in parts by weight or weight percentages unless otherwise specified. Except for Probe Hardness, the test methods used in the examples are American Society for Testing Materials (ASTM) test methods, and the following specific methods were used:

| TEST | ASTM No. |
|---|---|
| Melt Viscosity | ATSM D-3236 |
| Ring and Ball Softening Point | ASTM D-36 |
| Shore Hardness | ASTM D-2240 |

For the Probe Hardness test, 90 grams of gel were poured hot into a 150 ml beaker and cooled to 25° C. Probe Hardness is the force in grams required to push a 0.5 inch diameter cylindrical acrylic probe into the gel to a depth of 4 mm at a rate of 1.0 mm/second. The equipment used for this test was a TA.XT2i Texture Analyzer with a TA-10 probe from Texture Technologies Corp., Scarsdale, N.Y.

EXAMPLE 1

In this example, various block copolymers were used to gel various ester oils including those that fall within the scope of the present invention, and those that fall outside the scope of the present invention. Specifically, the anionic block copolymers employed in this example included: Copolymer 1 (a copolymer within the present invention), Copolymer 2 (another copolymer within the scope of the present invention) and Copolymer 3 (a copolymer outside of the present invention). Copolymer 1 was a S-EB/S-S polymer in which each S end block had a MW of about 29,000 and the EB/S midblock had a MW of 80,000/50,000. The styrene content of Copolymer 1 was 57.5% by weight and the styrene content of the EB/S midblock was 39% by weight. Copolymer 2 was a S-EB/S-S polymer in which each S end block had a MW of about 9,500 and the EB/S midblock had a MW of 60,000/20,000. The styrene content of Copolymer 2 was about 39.5% by weight and the styrene content in the EB/S midblock was about 25% by weight. Copolymers 1 and 2 had a 1,2/1,4-Bd ratio of about 40/60. Copolymer 3 was a S-EB-S type polymer having the following block MW 10,000-80,000-10,000; % weight S of 20.5 and a 1,2/1,4-Bd ratio of 65/35.

In this example, Cargill® Soybean Oil (a triglyceride of $C_{18}$ acids), Erucicial® EG-20 (an eicosyl erucate ester supplied by Lambert Tech), Finester® EH-25 (a $C_{12-15}$ alkyl octanoate supplied by Fintex), Finsolv® TN (a $C_{12-15}$ alkyl benzoate supplied by Fintex) and Neo Heliopan AV® (an octyl methoxy cinnamate supplied by Liberty Natural) were used. The first three ester oils fall within the scope of the present invention, while the last two ester oils are aromatic oils that fall outside the scope of the present invention.

Copolymer 1 was blended into the oils at 7.5% by weight copolymer and Copolymers 2 and 3 were blended into the oils at 15% by weight copolymer. 0.1% by weight Irganox® 1010 (a hindered phenolic antioxidant supplied by Ciba) was also included in each blend. The polymers were mixed into the oils by blending for about 1 to 1.5 hour at 130°-170° C. with a Silverson® mixer. Table 1 below shows the various oil gels that were prepared and provides characterization of the resultant oil gels.

TABLE 1

| | Gels of Ester Oils | | |
|---|---|---|---|
| | Gel 1: 7.5% by weight Copolymer 1 + 92.4% by weight oil | Gel 2: 15.0% by weight Copolymer 2 + 84.9% by weight oil | Gel 3: 15.0% by weight Copolymer 3 + 84.9% by weight oil |
| Soybean Oil | Yellow, slight haze, solid rubbery gel, very slight oil bleed after 1 month | Yellow, slight haze, self-levels | Yellow, opaque, solid rubbery gel, some free oil |
| Erucical ® EG-20 | Yellow, clear, solid rubbery gel, no free oil | Yellow, slight haze, solid rubbery gel, no free oil | Yellow, clear, solid rubbery gel, no free oil |
| Finester ® EH-25 | Very slight haze, colorless, solid rubbery gel, no free oil | Bluish haze, colorless, thickened but low viscosity | Bluish haze, colorless, thickened but low viscosity |

TABLE 1-continued

| | Gels of Ester Oils | | |
|---|---|---|---|
| | Gel 1: 7.5% by weight Copolymer 1 + 92.4% by weight oil | Gel 2: 15.0% by weight Copolymer 2 + 84.9% by weight oil | Gel 3: 15.0% by weight Copolymer 3 + 84.9% by weight oil |
| Finsolv ® TN | Colorless, very clear, low viscosity | Colorless, slight haze, thickened but low viscosity | Colorless, very slight haze, thickened but low viscosity |
| Neo Heliopan AV ® | Thickened, slight thixotropy, clear, colorless, very slight bluish haze | Very slight bluish haze, colorless, thixotropic gel, no elasticity | Low viscosity, slight bluish haze, colorless |

The results provided in Table 1 illustrate that in soybean oil, both Copolymer 1 and 2 gave fairly clear blends. Copolymer 1 gave a nice rubbery gel, although it was quite soft. Copolymer 2 thickened soybean oil, but did not gel it at 15% weight. Copolymer 3 was incompatible with soybean oil; it made an opaque gel and the polymer did not hold oil. In Erucical® EG-20, all three polymers gave a nice, clear, rubbery gel with no oil bleed. In Finester® EH-25, all three polymers gave a nearly clear blend, but only Copolymer 1 gelled that oil. In the two aromatic ester oils, all three polymers were soluble and gave clear blends, but none of them gave a rubbery gel in the oils.

EXAMPLE 2

In this example, Copolymer 1 was compared with Copolymer 4 (an S-EB-S type polymer having block MW of 29,000-130,000-29,000, a styrene % weight of 33 and a 1,2/1,4-Bd ratio of 40/60). The various esters employed in Example 1 were used in this example as well. Table 2 includes the formulations and results with Copolymer 1, while Table 3 includes the formulations and results for Copolymer 4.

TABLE 2

| | Gels of Ester Oils | | | | |
|---|---|---|---|---|---|
| Composition, % weight | A | B | C | D | E |
| Soybean oil | 92.4 | | | | |
| Erucical ® EG-20 | | 92.4 | | | |
| Finester ® EH-25 | | | 92.4 | | |
| Neo Heliopan AV ® | | | | 92.4 | |
| Finsolv ® TN | | | | | 92.4 |
| Copolymer 1 | 7.5 | 7.5 | 7.5 | 7.5 | 7.5 |
| Irganox ® 1010 | 0.1 | 0.1 | 0.1 | 0.1 | 0.1 |
| R&B Softening Point, ° C. | 67 | 88 | 53 | Slight thixotropy | Low viscosity |
| Shore 00 Hardness | 0 | 0 | 0 | | |
| Probe Hardness, gm | 58 | 79 | 37 | | |
| Appearance | Yellow, slight haze, slight oil bleed | Yellow, clear, no oil bleed | Very slight haze, colorless, no oil bleed | Very slight bluish haze, slight thixotropy | Colorless, very clear, low viscosity |

TABLE 3

| | Gels of Ester Oils | | | | |
|---|---|---|---|---|---|
| Composition, % weight | F | G | H | I | J |
| Soybean oil | 92.4 | | | | |
| Erucical ® EG-20 | | 92.4 | | | |
| Finester ® EH-25 | | | 92.4 | | |
| Neo Heliopan AV ® | | | | 92.4 | |
| Finsolv ® TN | | | | | 92.4 |
| Copolymer 4 | 7.5 | 7.5 | 7.5 | 7.5 | 7.5 |
| Irganox ® 1010 | 0.1 | 0.1 | 0.1 | 0.1 | 0.1 |
| R&B Softening | | 90 | 43 | | |

TABLE 3-continued

Gels of Ester Oils

| Composition, % weight | F | G | H | I | J |
|---|---|---|---|---|---|
| Point, °C. | | | | | |
| Shore 00 Hardness | | 0 | 0 | | |
| Probe Hardness, gm | | 72 | 68 | | |
| Appearance | Yellow, opaque gel floating oil | Golden, clear | Slight haze, colorless | Hazy, gritty surface, low viscosity, no thixotropy | Clear, colorless, moderate viscosity |

Note that the copolymers behave similarly in all oils except for soybean oil in which Copolymer 4 was incompatible.

EXAMPLE 3

In this example, more blends were made with Copolymer 1 to better understand its capability. Table 4 presents formulations and results for Copolymer 1 in non-aromatic ester oils of the present invention. Table 5 shows blends of Copolymer 1 with aromatic oils for comparative purposes.

As shown in Table 4, in soybean oil, Copolymer 1 at 9% by weight still showed a very slight oil bleed. At 12% by weight, no oil bleed was found. Blends at up to 15% by weight of Copolymer 1 could be made, but it is likely that higher concentrations would be too viscous to mix with the Silverson® mixer. The gels in soybean oil become clearer with increasing Copolymer 1 content.

TABLE 4

Copolymer 1 in Gels with non-Aromatic Ester Oils

| Composition, % weight | K | L | M | N | O | P | Q | R | S | T | U | V | W |
|---|---|---|---|---|---|---|---|---|---|---|---|---|---|
| Soybean oil | 92.4 | 90.9 | 87.9 | 84.9 | | | | | | | | | |
| Erucical ® EG-20 | | | | | 92.4 | 90.9 | 87.9 | | | | | | |
| Finester ® EH-25 | | | | | | | | 92.4 | 90.9 | 87.9 | 84.9 | 79.9 | 74.9 |
| Copolymer 1 | 7.5 | 9 | 12 | 15 | 7.5 | 9 | 12 | 7.5 | 9 | 12 | 15 | 20 | 25 |
| Irganox ® 1010 | 0.1 | 0.1 | 0.1 | 0.1 | 0.1 | 0.1 | 0.1 | 0.1 | 0.1 | 0.1 | 0.1 | 0.1 | 0.1 |
| R&B Softening Point, °C. | 67 | 71 | 78 | 87 | 88 | 91 | 109 | 53 | 56 | 52 | 54 | 68 | 81 |
| Shore 00 Hardness | 0 | 0 | 8 | 12.5 | 0 | 0 | 0 | 0 | 0 | 0 | 0 | 13.5 | 27 |
| Probe Hardness, gm | 58 | 91 | 190 | 325 | 79 | 95 | 175 | 37 | 59 | 122 | 209 | 433 | 817 |
| Oil Bleed Out | Slight | Very slight | No | No | No | No | No | No | No | No | No | No | No |

TABLE 5

Copolymer 1 in Gels with Aromatic Ester Oils

| Composition, % weight | X | Y | Z | AA | BB | CC | DD |
|---|---|---|---|---|---|---|---|
| Neo Heliopan AV ® | 92.4 | 90.9 | | | | | |
| Finsolv ® TN | | | 92.4 | 89.9 | 87.4 | 84.9 | 79.9 |
| Copolymer 1 | 7.5 | 9 | 7.5 | 10 | 12.5 | 15 | 20 |
| Irganox ® 1010 | 0.1 | 0.1 | 0.1 | 0.1 | 0.1 | 0.1 | 0.1 |
| Viscosity at 25° C. | Low | Moderate | Low | Low | Moderate | Moderate | High |
| Clarity | | Slight thixotropy | | Very slight haze | Very slight haze | Very slight haze | Very slight haze |

The results in Table 4 show that Copolymer 1 had excellent compatibility with Erucical® EG-20. The blends were optically clear and showed no oil bleed, even at 7.5% by weight. These blends gave the highest softening points, but also the highest melt viscosity.

The results in Table 4 show that Copolymer 1 also had excellent compatibility with Finester® EH-25. These blends showed good clarity, no oil bleed and they were colorless. These blends gave much lower softening points than the blends with soybean oil and Erucical® EG-20. Softening points remained fairly low until the Copolymer 1 concentration reached about 20% by weight. Fortunately, blends in Finester® EH-25 had relatively low viscosity so blends can be made with the Silverson® mixer at up to 25% by weight of Copolymer 1. Since gel hardness is directly related to polymer content, this low viscosity allowed gels to be made with Finester® EH-25 that have relatively high hardness.

The results in Table 5 show that none of the blends made with the aromatic oils gelled. Blends with Finsolv® TN at up to 20% by weight of Copolymer 1 were thick but had almost no thixotropy or elasticity.

EXAMPLE 4

In this example, an oil gel composition comprising coconut oil and Copolymer 1 was prepared as outlined in Example 1 above. A comparison is shown with Copolymer 4. Stirring was performed at 160°-170° C. The coconut oil was 76° Edible Coconut Oil from Alnoroil Company, Valley Stream, N.Y. The following formulations were prepared and exhibited the following properties:

TABLE 6

Oil Gel Compositions with Coconut Oil

| Composition, % by weight | EE | FF | GG | HH | II |
|---|---|---|---|---|---|
| Coconut Oil | 92.4 | 90.9 | 87.9 | 84.9 | 92.4 |
| Copolymer 1 | 7.5 | 9 | 12 | 15 | |
| Copolymer 4 | | | | | 7.5 |
| Irganox ® 101 | 0.1 | 0.1 | 0.1 | 0.1 | 0.1 |
| R&B Softening Point, ° C. | 67 | 69 | 72 | 87 | |
| Probe Hardness, gm | 65 | 160 | 220 | 340 | |

When freshly made, Gels EE-HH were clear, rubbery gels at room temperature. After a few days, the coconut oil crystallized and the gels became opaque. When freshly made, Gel II was rubbery, but it was opaque and bled oil badly at room temperature, showing that the conventional S-EB-S polymer is incompatible with coconut oil.

EXAMPLE 5

In this example of the present invention, various block copolymers were used to determine their compatibility with rapeseed oil. Specifically, the anionic block copolymers employed in this example of the present application included: Copolymer 1, Copolymer 2, Copolymer 4, Copolymer 5, Copolymer 6 and Copolymer 7. Copolymers 1 and 2 are representative of the broad copolymer description of the present application, the remaining copolymers in this example are representative of the prior art. Copolymers 1, 2 and 4 are as described in the previous examples. Copolymer 5 is an S-EB-S triblock polymer where S represents a polystyrene block having a molecular weight of about 10,000 and EB represents a hydrogenated polybutadiene block having a molecular weight of about 47,000 and a 1,2/1,4-butadiene ratio of 40/60. Copolymer 5 contains 30 % by weight of styrene. Copolymer 6 is the same as Copolymer 5 except the polystyrene block and hydrogenated polybutadiene block molecular weights are 7,000 and 33,000 and the polymer has been grafted with 1.7% by weight of maleic anhydride. Copolymer 7 is an S-EP diblock polymer where S represents a polystyrene block having a molecular weight of about 35,000 and EP represents a hydrogenated polyisoprene block having a molecular weight of about 63,000. Copolymer 7 contains 36% by weight of styrene.

In this example, rapeseed oil, which falls within the scope of the present invention, was used. In each case, the copolymers were blended into the rapeseed oil at 9% by weight copolymer. 0.1% by weight Irganox® 1010 was also included in each blend. The copolymers were mixed into the oils by blending for about 1 to about 1.5 hours at 130°-170° C. with a Silverson® mixer. Table 7 shows the gels that were prepared and provides some characterization of the resultant oil gels.

The characterizations provided in Table 7 are qualitative observations about the physical aspects of the resultant gel after mixing. Included are observations about the gel when it was hot, after it was cooled and after strorage. By 'hot' is meant the observation of clarity of the blend when it is at 130°-170° C. immediately after mixing. A suitable gel should be nearly clear when it is hot. By 'cooled' is meant the observation of the clarity and consistency of the blend after it has cooled to room temperature. A suitable gel should again be nearly clear and should be cohesive. By "after storage" is meant the observation of the appearance of the gel after it has been stored in a jar for about a week at room temperature. A suitable gel should show no bleed out or phase separation.

TABLE 7

Gels based on 9% by weight Copolymer in Rapeseed Oil

| | Hot | Cooled | After Storage |
|---|---|---|---|
| Copolymer 1 | Clear | Clear, cohesive | No bleed out |
| Copolymer 2 | Clear | Hazy, homogeneous grease | N/A |
| Copolymer 4 | Hazy white | Hazy white | Phase separation, not a well compatible gel |
| Copolymer 5 | Clear | White hazy, cohesive, some bleed out | Phase separation, not a well compatible gel |
| Copolymer 6 | Hazy white | Hazy white, cohesive, some bleed out | Phase separation, not a well compatible gel |
| Copolymer 7 | Hazy white | Hazy white | Phase separation, not a well compatible gel |

Table 7 clearly shows that Copolymer 1 at 9% by weight was the only copolymer that made a clear, cohesive gel, without bleed out. Copolymer 2 did not provide a gel at the weight used in this study. The other copolymers, e.g., Copolymers 4, 5, 6 and 7, which were representative of the prior art also did not provide a gel.

EXAMPLE 6

In this example, various oil gels were prepared comprising various amounts of rapeseed oil and Copolymer 1. The gels were prepared as in Example 5. The following formulations were prepared and exhibited the following properties:

TABLE 8

Oil Gel Compositions with Rapeseed Oil and Copolymer 1

| Sample No. | Weight % Rapeseed oil | Hot | Cooled | Storage |
|---|---|---|---|---|
| JJ | 2 | Clear | Hazy, non-cohesive | N/A |
| KK | 4 | Clear | Hazy, cohesive, no bleed | Bleeding |
| LL | 6 | Clear | Slight haze, cohesive, no bleed | Almost no bleed |
| MM | 9 | Clear | Clear, cohesive, no bleed | No bleed |

The data in Table 8 show the influence of the copolymer concentration on the physical aspects of the gel. A minimum of 6% of Copolymer 1 appears to be necessary to obtain a stable cohesive gel.

In addition to using rapeseed oil, a sample was made wherein the oil was olive oil instead of rapeseed oil. In this sample, 9% by weight of Copolymer 1 and olive oil were used. The resultant oil gel made from olive oil and Copolymer 1 had the following characteristics: It was clear when "Hot"; It was a clear, cohesive gel when "cooled" to room temperature; and it showed no oil bleed during "storage".

EXAMPLE 7

In this example, the compatibility of a diblock copolymer, i.e., Copolymer 8, of the present invention with various ester oils was investigated. Copolymer 8 (which is representative of the present invention) is an S-EB/S diblock polymer wherein S is a polystryrene block having a molecular weight of 44,000 and EB/S represents a controlled distribution copolymer block of molecular weights 57,000/33,000 which had been selectively hydrogenated to remove at least 95% of the butadiene double bonds. The styrene content of the EB/S block of Copolymer 8 was approximately 37 weight percent (25 mole percent) and the 1,2/1,4-butadiene ratio was 21/79. The total styrene content of Copolymer 8 was 57% by weight. Copolymer 8 was made using the basic procedure outlined above. Specifically, the polymerization was performed at 50° C. in cyclohexane containing 0.5% by weight diethyl ether.

Each formulation made contained 87.9% by weight oil, 12.0% by weight of Copolymer 8, and 0.1% by weight Irganox® 1010. Each of the formulations was blended as described in Example 1 and the viscosity (Brookfield heliopath viscosity) of each of the formulations was determined at 23° C. with a #95 T-bar spindle at 2.5 rpm.

TABLE 9

Compatibility of Copolymer 8 with Various Ester Oils

| Sample | Oil | Viscosity, Pa·s | Appearance |
|---|---|---|---|
| NN | Soybean Oil | 290 | Nice, slight haze, thixotropic gel |
| OO | Erucicial ® EG-20 | 300 | Nice, very slight haze, thixotropic gel |
| PP | Finester ® EH-25 | 180 | Nice, very slight haze, thixotropic gel |
| QQ | Neo Heliopan AV ® | 420 | Nice, very slight bluish haze, thixotropic gel |
| RR | Finsolv ® TN | 25 | Very slight hazy solution |

The data in Table 9 show that Copolymer 8 provided suitable thixotropic gels having the consistency of a grease for the non-aromatic ester oils used in Samples NN-PP. With respect to the aromatic ester oils used in Samples QQ and RR, Copolymer 8 thickened the oil in Sample RR but it was low in viscosity and it did not have the consistency of a thixotropic gel. Quite surprisingly, Copolymer 8 thickened the oil in Sample QQ, giving a very nice thixotropic gel.

EXAMPLE 8

In this example, oil gel compositions were made using Copolymer 1 and Copolymer 4 in oils which are typically used as plasticizers. The compositions which were made and their properties are given in Table 10 and Table 11. TXIB® is 2,2,4-trimethyl-1,3-pentanediol diisobutyrate from Eastman. PureSyn® 3E20 is trimethylolpropane tricaprylate from ExxonMobil. DOS® is bis-2-ethylhexyl sebacate from Aldrich. Santicizer® 160 is butyl benzyl phthalate from Ferro. TOTM® is trioctyl trimellitate from Eastman. It should be noted that TXIB®, PureSyn 3E20® and DOS® fall within the definition of a non-aromatic ester oil, while Santicizer® 160 and TOTM® are aromatic ester oils which fall outside the scope of the claimed invention.

TABLE 10

Copolymer 1 in Plasticizer-Type Oils

| Composition, % by weight | SS | TT | UU | VV | WW | XX |
|---|---|---|---|---|---|---|
| TXIB ® | 92.5 | | | | | |
| PureSyn ® 3E20 | | 92.5 | | | | |
| DOS ® | | | 90 | | | |
| Santicizer ® 160 | | | | 90 | | |
| TOTM ® | | | | | 90 | 80 |
| Copolymer 1 | 7.5 | 7.5 | 10 | 10 | 10 | 20 |
| Appearance | Clear solution | Clear Solution | Clear solution | Clear solution | Slight haze, very tacky, rubbery gel | Clear, tacky, rubbery gel |

TABLE 11

Copolymer 4 in Plasticizer-Type Oils

| Composition, % by weight | XX | YY | ZZ | AAA | BBB |
|---|---|---|---|---|---|
| TXIB ® | 92.5 | | | | |
| PureSyn ® 3E20 | | 92.5 | | | |
| DOS ® | | | 90 | | |

TABLE 11-continued

Copolymer 4 in Plasticizer-Type Oils

| Composition, % by weight | XX | YY | ZZ | AAA | BBB |
|---|---|---|---|---|---|
| Santicizer ® 160 | | | | 90 | |
| TOTM ® | | | | | 90 |
| Copolymer 4 | 7.5 | 7.5 | 10 | 10 | 10 |
| Appearance | Very hazy | Phase separated | Phase separated | Phase separated | Phase separated |

Results show Copolymer 1, which is within the scope of this invention, gives blends which are clear, showing that Copolymer 1 has good compatibility with these polar oils. In contrast, the conventional S-EB-S polymer, Copolymer 4, gives blends which are very hazy or are not phase stable, showing that Copolymer 4 has poor compatibility with these polar oils.

EXAMPLE 9

In this example, oil gel compositions were made using 12% by weight of Copolymer 8 and Copolymer 7 in oils which are typically used as plasticizers. The compositions which were made and their properties are given in Table 12 and Table 13. Benzoflex 131 is Isodecyl Benzoate from Velsicol.

TABLE 12

Copolymer 8 in Plasticizer-Type Oils

| Sample | Oil | Viscosity, Pa · s | Appearance |
|---|---|---|---|
| CCC | DOS ® | 55 | Slight haze |
| DDD | PureSyn ® 3E20 | 270 | Slight haze |
| EEE | TOTM ® | Paste | Very hazy |
| FFF | Benzoflex ® 131 | 16 | Slight haze |
| GGG | Santicizer ® 160 | 4 | Slight haze |

Viscosities were measured with a Brookfield heliopath viscometer at 23 degrees C. with a #95 T-bar spindle at 2.5 rpm.

TABLE 13

Copolymer 7 in Plasticizer-Type Oils

| Sample | Oil | Appearance |
|---|---|---|
| HHH | DOS ® | Phase separated |
| III | PureSyn ® 3E20 | Phase separated |
| JJJ | TOTM ® | Clear |
| KKK | Benzoflex ® 131 | Phase separated |
| LLL | Santicizer ® 160 | Clear |

Results in Table 12 show that Copolymer 8, which is within the scope of this invention, gives blends which are only slightly hazy with all except TOTM® where the blend is very hazy, showing that Copolymer 8 has good compatibility with all these polar oils except TOTM®. Sample DDD with PureSyn® 3E20 was particularly good because it was a thixotropic gel having the consistency of a soft grease. Results in Table 13 show that the conventional S-EP polymer, Copolymer 7, is incompatible with three of these polar oils and gave clear blends with TOTM® and Santicizer® 160.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. An oil gel composition comprised of at least one hydrogenated block copolymer and a non-aromatic ester oil or mixture of non-aromatic ester oils, wherein said non-aromatic ester oil is a natural product oil, eicosyl erucate or a C12-15alkyl octanoate wherein said hydrogenated block copolymer has at least one polymer block A and at least one polymer block B, and wherein:
   a. prior to hydrogenation each A block is a mono alkenyl arene homopolymer block and each B block is a controlled distribution copolymer block of at least one conjugated diene and at least one mono alkenyl arene;
   b. subsequent to hydrogenation about 0-10% of the arene double bonds have been reduced, and at least about 90% of the conjugated diene double bonds have been reduced;
   c. each A block has a number average molecular weight between about 3,000 and about 60,000 and each B block has a number average molecular weight between about 20,000 and about 300,000;
   d. each B block comprises terminal regions adjacent to the A blocks that are rich in conjugated diene units and one or more regions not adjacent to the A blocks that are rich in mono alkenyl arene units;
   e. the total amount of mono alkenyl arene in the hydrogenated block copolymer is about 20 percent weight to about 80 percent weight; and
   f. the weight percent of mono alkenyl arene in each B block is between about 10 percent and about 75 percent;

and wherein the amount of non-aromatic ester oil is between about 250 to about 2000 parts by weight per 100 parts by weight of said at least one hydrogenated block copolymer.

2. The oil gel composition of claim 1 wherein said mono alkenyl arene is styrene and said conjugated diene is selected from the group consisting of isoprene and butadiene.

3. The oil gel composition of claim 2 wherein said conjugated diene is butadiene, and wherein about 20 to about 80 mol percent of the condensed butadiene units in block B have a 1,2-configuration.

4. The oil gel composition of claim 2 wherein said conjugated diene is butadiene, and wherein about 35 to about 55 mol percent of the condensed butadiene units in block B have a 1,2-configuration.

5. The oil gel composition of claim 1 wherein said polymer block B has a mono alkenyl arene blockiness of less than about 40 mol percent.

6. The oil gel composition of claim 2 wherein the polymer is an ABA polymer and each block B has a center region with a minimum ratio of butadiene units to styrene units.

7. The oil gel composition of claim 2 wherein the weight percent of styrene in each B block is between about 10 percent and about 50 percent, and the styrene blockiness index of each block B is less than about 10 percent, said styrene blockiness index being defined to be the proportion of styrene units in the block B having two styrene neighbors on the polymer chain.

8. The oil gel composition of claim 1 wherein said hydrogenated block copolymer has a general configuration AB, ABA, (A-B)n, (A-B)nA, (A-B)nX or mixtures thereof where n is an integer from 2 to about 30, and X is the coupling agent residue.

9. The oil gel composition of claim 8 wherein said hydrogenated block copolymer is a linear hydrogenated ABA styrene/butadiene block copolymer having a total molecular weight of about 80,000 to about 200,000.

10. The oil gel composition of claim 1 wherein said hydrogenated block polymer is a S-EB/S-S type polymer having a block molecular weight of 29,000-80,000/50,000-29,000, a % weight S of 57.5%, a % weight S in the EB/S block of 39% and a 1,2/1,4-butadiene ratio of 40/60.

11. The oil gel composition of claim 1 wherein said hydrogenated block copolymer is a S-EB/S type polymer, wherein the S block has a molecular weight from about 30,000 to about 50,000, the EB unit of the EB/S block has a molecular weight from about 50,000 to about 65,000, the S unit of the EB/S block has a molecular weight from about 30,000 to about 40,000, the EB/S block is selectively hydrogenated to remove at least 90% of the butadiene double bonds, the styrene content of the EB/S block is from about 30 to about 40 weight percent, the 1,2/1,4-butadiene ratio is from about 15/85 to about 30/70, and the total styrene content of the S-EB/S type polymer is from about 50 to about 65.

12. The oil composition of claim 1 wherein said natural product oil is soybean oil, coconut oil, or rapeseed oil.

13. The oil gel composition of claim 1 wherein the amount of non-aromatic ester oil is between about 400 to about 1000 parts by weight per 100 parts by weight of said at least one hydrogenated block copolymer.

14. The oil gel composition of claim 1 wherein said hydrogenated block polymer is a S-EB/S-S type polymer having a block molecular weight of 29,000-80,000/50,000-29,000, a % weight S of 57.5%, a % weight S in the EB/S block of 39% and a 1,2/1,4-butadiene ratio of 40/60; and said natural product oil is soybean oil, coconut oil, or rapeseed oil.

15. An article comprising at least the oil gel composition of claim 1.

16. An article comprising at least the oil gel composition of claim 11.

17. An article comprising at least the oil gel composition of claim 14.

18. The oil gel composition of claim 12 wherein the amount of non-aromatic ester oil is between about 400 to about 1000 parts by weight per 100 parts by weight of said at least one hydrogenated block copolymer.

* * * * *